(12) United States Patent
Fukuta et al.

(10) Patent No.: US 8,094,715 B2
(45) Date of Patent: Jan. 10, 2012

(54) VIDEO SIGNAL ENCODING DEVICE AND VIDEO SIGNAL ENCODING METHOD

(75) Inventors: Tomonori Fukuta, Tokyo (JP); Yoshiko Hatano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1641 days.

(21) Appl. No.: 10/543,826

(22) PCT Filed: Dec. 25, 2003

(86) PCT No.: PCT/JP03/16761
§ 371 (c)(1),
(2), (4) Date: Apr. 14, 2006

(87) PCT Pub. No.: WO2004/082290
PCT Pub. Date: Sep. 23, 2004

(65) Prior Publication Data
US 2006/0209949 A1   Sep. 21, 2006

(30) Foreign Application Priority Data
Mar. 10, 2003   (JP) .................................. 2003-063804

(51) Int. Cl.
  *H04B 1/66* (2006.01)
  *H04N 7/12* (2006.01)
  *H04N 11/00* (2006.01)
  *H04N 11/04* (2006.01)

(52) U.S. Cl. ......... 375/240.03; 375/240.29; 375/240.12; 375/240.18; 382/275; 382/270; 382/260; 382/264; 348/701

(58) Field of Classification Search ............. 375/240.03, 375/240.29, 240.12, 240.18
See application file for complete search history.

(56) References Cited

U.S. PATENT DOCUMENTS

| | | | | |
|---|---|---|---|---|
| 4,684,983 A |   | 8/1987 | Acampora et al. | |
| 5,161,018 A | * | 11/1992 | Matsunaga | 348/620 |
| 5,450,214 A | * | 9/1995 | Nobuoka | 358/479 |
| 5,787,129 A | * | 7/1998 | Willming | 375/346 |
| 5,790,195 A |   | 8/1998 | Ohsawa | |
| 6,008,866 A | * | 12/1999 | Komatsu | 348/701 |
| 6,408,104 B1 | * | 6/2002 | Lim et al. | 382/275 |

(Continued)

FOREIGN PATENT DOCUMENTS

EP   0593099 A1   4/1994
(Continued)

OTHER PUBLICATIONS

Ohmsha, MPEG, The Institute of image information and television engineers, pp. 96-109, Apr. 20, 1996.

*Primary Examiner* — Jayanti K Patel
*Assistant Examiner* — Jessica Prince
(74) *Attorney, Agent, or Firm* — Birch, Stewart, Kolasch & Birch, LLP

(57) ABSTRACT

Included are: a prefilter (101) for outputting, based on filter characteristics control data, predetermined frequency components in an input video signal as current image data; encoding means (116) for subjecting the current image data to an encoding process, and outputting encoding parameters together with a bit stream corresponding to current image data as a result of the encoding process; and filter control means (117) for outputting the filter characteristics control data that is set based only on one or two of the encoding parameters.

9 Claims, 19 Drawing Sheets

U.S. PATENT DOCUMENTS

| | | |
|---|---|---|
| 6,633,683 B1 | 10/2003 | Dinh et al. |
| 7,194,135 B2 * | 3/2007 | Satou et al. ................. 382/236 |
| 2002/0171767 A1 | 11/2002 | Piepers |

FOREIGN PATENT DOCUMENTS

| | | |
|---|---|---|
| JP | 5-344346 A | 12/1993 |
| JP | 6-70299 A | 3/1994 |
| JP | 6-225276 A | 8/1994 |
| JP | 7-107462 A | 4/1995 |
| JP | 7-203428 A | 8/1995 |
| JP | 8-9370 A | 1/1996 |
| JP | 9-298753 A | 11/1997 |
| JP | 2000-115765 A | 4/2000 |
| JP | 2002-247576 * | 8/2002 |
| JP | 2002-247576 A | 8/2002 |
| WO | WO-0201855 A2 | 1/2002 |
| WO | WO-02/082823 A1 | 10/2002 |

* cited by examiner fs : SAMPLING FREQUENCY

FIG.5

| Qp | K |
|---:|---:|
| 1 | 0 |
| 2 | 0 |
| 3 | 0 |
| 4 | 0 |
| 5 | 0 |
| 6 | 0 |
| 7 | 0 |
| 8 | 0 |
| 9 | 1/4 |
| 10 | 1/4 |
| 11 | 1/4 |
| 12 | 1/4 |
| 13 | 1/4 |
| 14 | 1/4 |
| 15 | 1/4 |
| 16 | 1/4 |
| 17 | 1/2 |
| 18 | 1/2 |
| 19 | 1/2 |
| 20 | 1/2 |
| 21 | 1/2 |
| 22 | 1/2 |
| 23 | 1/2 |
| 24 | 1/2 |
| 25 | 1 |
| 26 | 1 |
| 27 | 1 |
| 28 | 1 |
| 29 | 1 |
| 30 | 1 |
| 31 | 1 |

FIG.6

| Qp | K |
|---|---|
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 0 |
| 11 | 1/4 |
| 12 | 1/4 |
| 13 | 1/4 |
| 14 | 1/4 |
| 15 | 1/4 |
| 16 | 1/4 |
| 17 | 1/4 |
| 18 | 1/4 |
| 19 | 1/4 |
| 20 | 1/4 |
| 21 | 1/2 |
| 22 | 1/2 |
| 23 | 1/2 |
| 24 | 1/2 |
| 25 | 1/2 |
| 26 | 1/2 |
| 27 | 1/2 |
| 28 | 1/2 |
| 29 | 1/2 |
| 30 | 1/2 |
| 31 | 1/2 |

FIG.13

| Qp | Th |
|---|---|
| 1 | Th1 |
| 2 | Th2 |
| 3 | Th3 |
| 4 | Th4 |
| 5 | Th5 |
| 6 | Th6 |
| 7 | Th7 |
| 8 | Th8 |
| 9 | Th9 |
| 10 | Th10 |
| 11 | Th11 |
| 12 | Th12 |
| 13 | Th13 |
| 14 | Th14 |
| 15 | Th15 |
| 16 | Th16 |
| 17 | Th17 |
| 18 | Th18 |
| 19 | Th19 |
| 20 | Th20 |
| 21 | Th21 |
| 22 | Th22 |
| 23 | Th23 |
| 24 | Th24 |
| 25 | Th25 |
| 26 | Th26 |
| 27 | Th27 |
| 28 | Th28 |
| 29 | Th29 |
| 30 | Th30 |

FIG.17
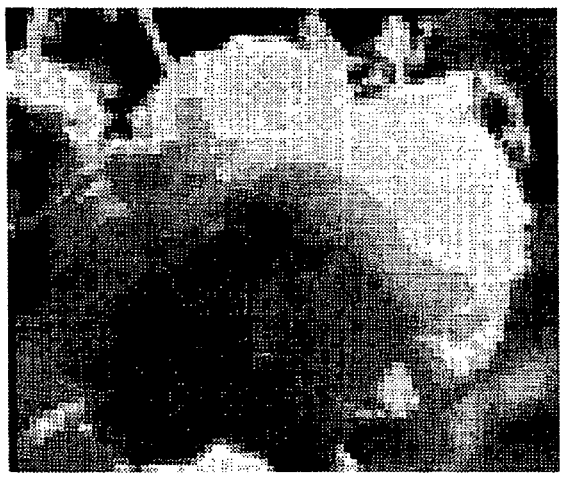
(a) IMAGE CORRESPONDING TO PRECEDING IMAGE DATA
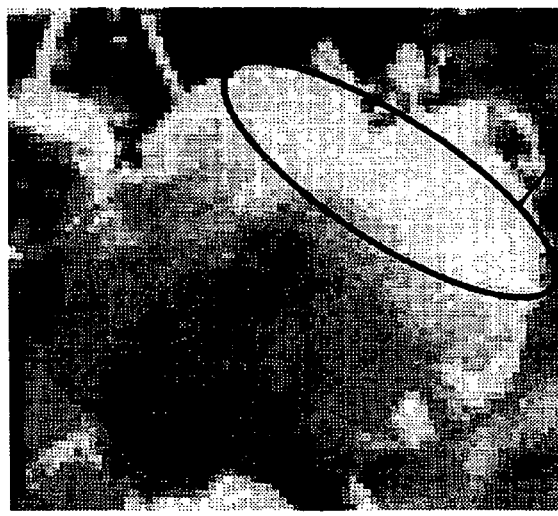
(b) IMAGE CORRESPONDING TO CURRENT IMAGE DATA
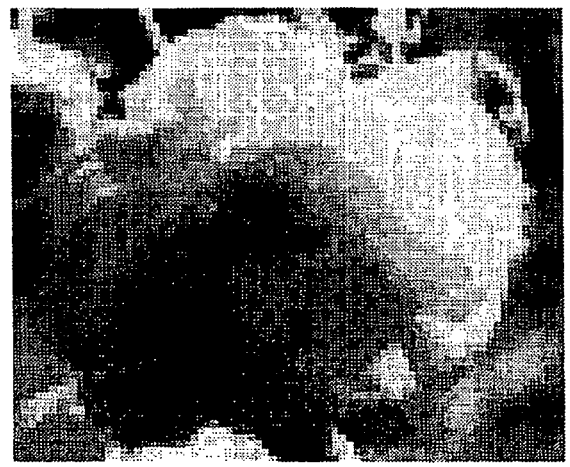
(c) IMAGE CORRESPONDING TO DATA PROVIDED BY NOISE REDUCTION FILTER

| | | BIT RATE | | | |
|---|---|---|---|---|---|
| | | b i _ 1 | b i _ 2 | .................. | b i _ n |
| ENCODE VOLUME | a i _ 1 | Q p i _ 1 1 | Q p i _ 1 2 | .................. | Q p i _ 1 n |
| | a i _ 2 | Q p i _ 2 1 | Q p i _ 2 2 | .................. | Q p i _ 2 n |
| | ⋮ | ⋮ | ⋮ | ⋮ | ⋮ |
| | a i _ n | Q p i _ n 1 | Q p i _ n 2 | .................. | Q p i _ n n |

(b)

| | | BIT RATE | | | |
|---|---|---|---|---|---|
| | | b j _ 1 | b j _ 2 | .................. | b j _ n |
| ENCODE VOLUME | a j _ 1 | Q p j _ 1 1 | Q p j _ 1 2 | .................. | Q p j _ 1 n |
| | a j _ 2 | Q p j _ 2 1 | Q p j _ 2 2 | .................. | Q p j _ 2 n |
| | ⋮ | ⋮ | ⋮ | ⋮ | ⋮ |
| | a j _ n | Q p j _ n 1 | Q p j _ n 2 | .................. | Q p j _ n n |

WHERE Qpi > Qpj

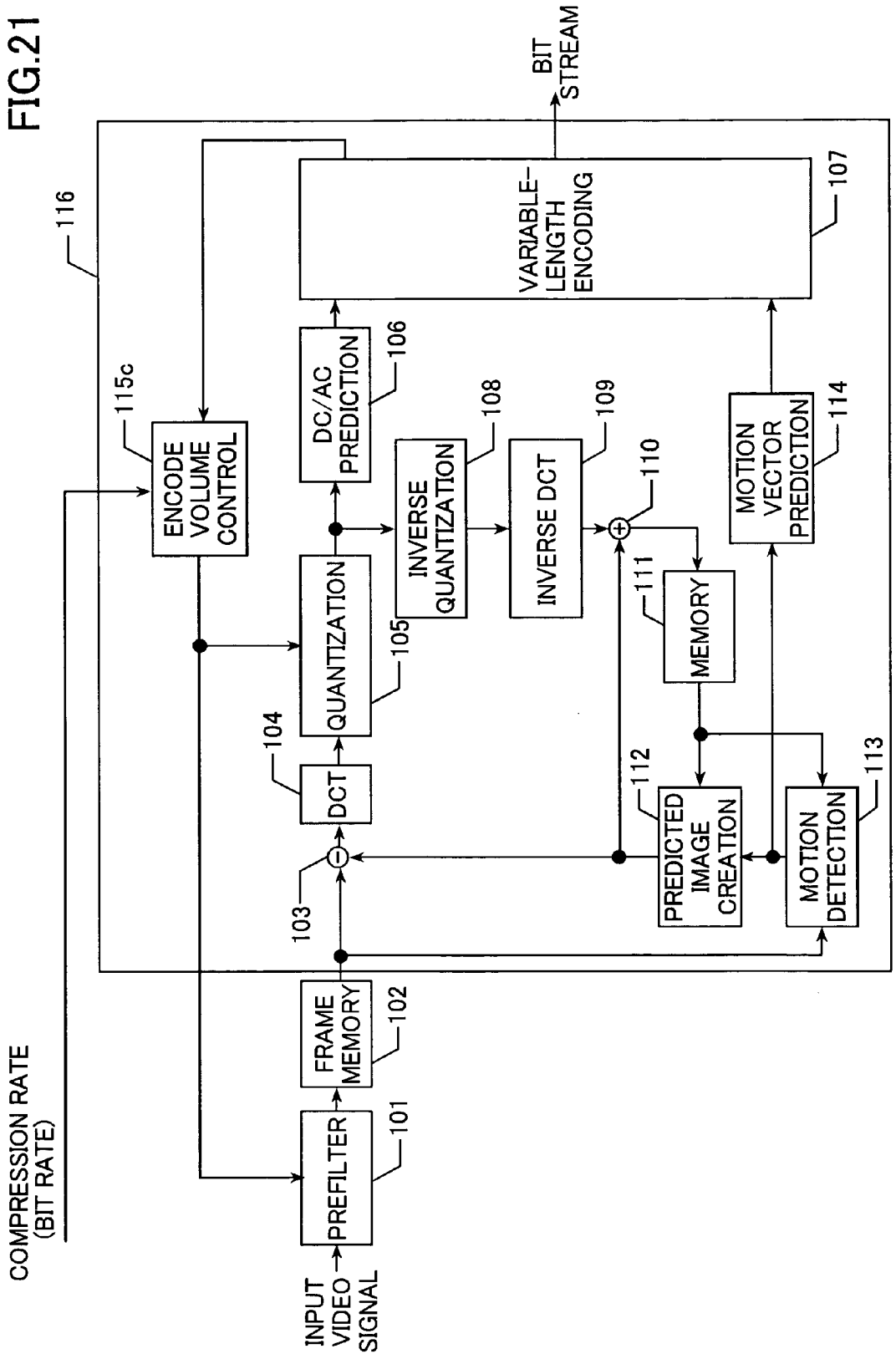

VIDEO SIGNAL ENCODING DEVICE AND VIDEO SIGNAL ENCODING METHOD

TECHNICAL FIELD

The present invention relates to devices and methods for encoding incoming video signals (hereinafter, referred also to as input video signals) and, more specifically, to a device and method suitable for cellular phones, TV phone systems, and the like.

BACKGROUND ART

In a conventional video encoding method, a prefilter having a plurality of characteristics is used to subject moving images to a filtering process prior to encoding, and the resulting moving images are encoded in one or more modes. The encoding mode (s) used for encoding the moving images are used to calculate an encoding difficulty together with the encode volume counted for every encoding mode, and the quantization step size counted also for every encoding mode. Using thus calculated encoding difficulty and any arbitrarily-set encoding output rate, the coefficient of a filter characteristic is calculated. Thus the calculated coefficient of a filter is used as a basis to make selections of the filter characteristics for the prefilter (as an example, refer to Patent Document below) JP-A-2002-247576 (pages 1 to 9, FIG. 1)

DISCLOSURE OF THE INVENTION

As described in the foregoing, with such a conventional video encoding method, for making selections of the characteristics for the prefilter, an encoding difficulty is calculated from the encoding mode (s) used for encoding of images, the encode volume counted for every encoding mode, and the quantization step size counted also for every encoding mode. The resulting encoding difficulty is then used together with the encoding output rate to calculate, the coefficient of a filter characteristic. In such a manner, computation of the coefficient of a filter characteristic is complicated, and the volume of computation required to calculate the coefficient of a filter characteristic is thus increased.

This resultantly increases the load on a computation section configured by a CPU or others, thereby increasing the power consumption. The matter of this power consumption is considered specifically important when the power source such as battery allowed for installation is necessarily limited in number or size due to limited size of devices such as cellular phones.

The present invention is proposed to solve such problems as described above, and provided thereby is a video signal encoding device capable of controlling the characteristics of a prefilter with no need for any complicated computation.

A video signal encoding device of the present invention is provided with:

a prefilter for outputting, based on filter characteristics control data, any given frequency components in an input video signal as current image data;

encoding means for subjecting the current image data to an encoding process, and outputs encoding parameters together with a bit stream corresponding to the current image data as a result of the encoding process; and filter control means for outputting the filter characteristics control data that is set based only on one or two of the encoding parameters.

BRIEF DESCRIPTION OF THE DRAWINGS

FIG. 5 is a diagram showing an exemplary data table.

FIG. 6 is a diagram showing another exemplary data table.

FIG. 13 is a diagram showing an exemplary data table configured by threshold values Th.

FIGS. 17 are diagrams each showing an exemplary image corresponding to image data that outputs from the noise reduction filter in the second embodiment.

FIGS. 20 are diagrams each showing an exemplary data table.

FIG. 21 is a block diagram showing a case where the video signal encoding device of the fourth embodiment is simplified in structure.

BEST MODE FOR CARRYING OUT THE INVENTION

Figure 1:
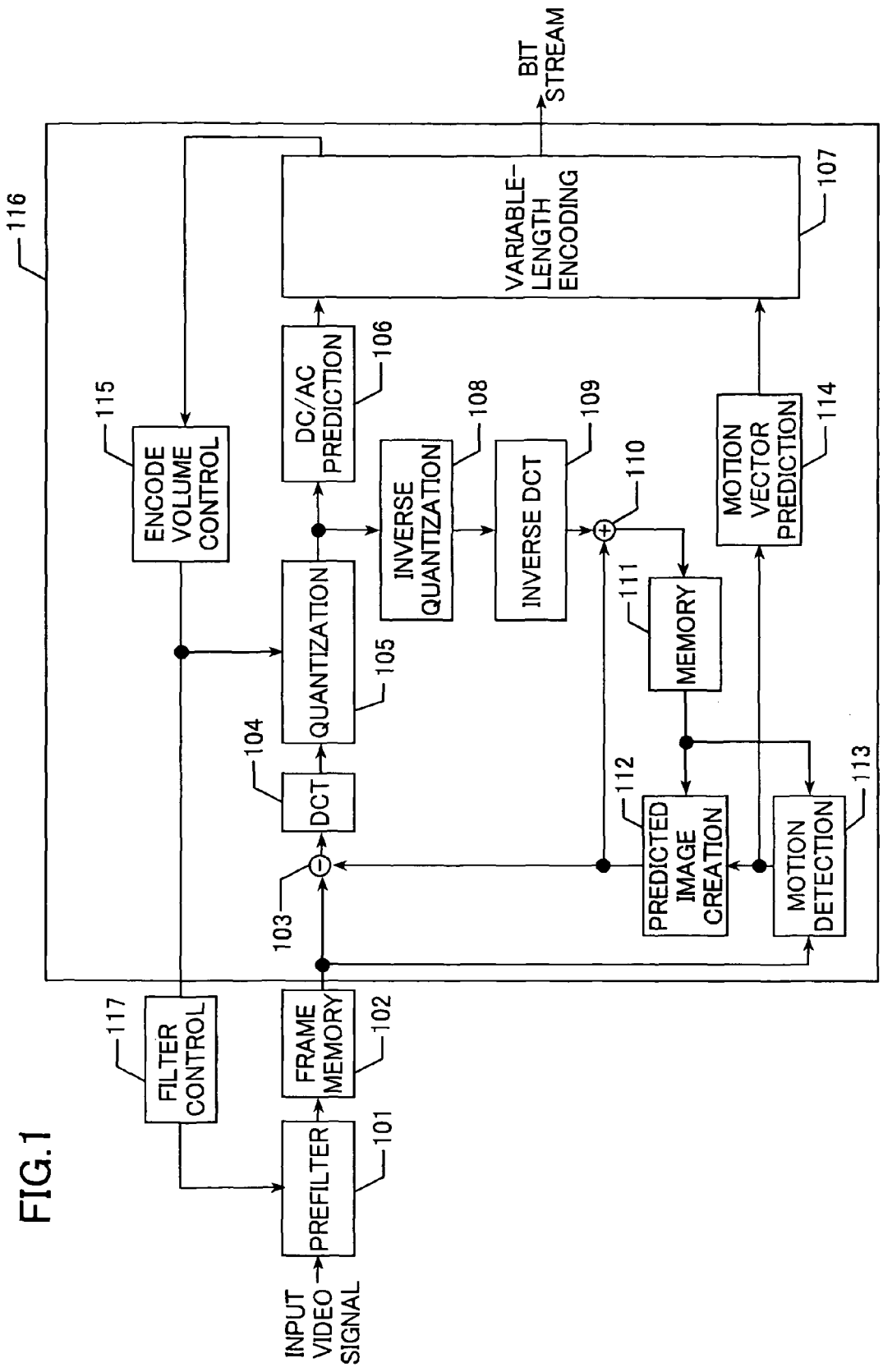
FIG. 1 is a block diagram showing a video signal encoding device in a first embodiment.

In the below, the present invention is described based on embodiments shown in the drawings.

First Embodiment

FIG. 1 is a block diagram showing a video signal encoding device in a first embodiment.

In FIG. 1, an incoming video signal is input into a prefilter 101 for extraction of any predetermined frequency components. Note that, in the below, the predetermined frequency components in the input video signal are referred also to as current image data.

The current image data thus extracted in the prefilter 101 is output to frame memory 102. Herein, the frame memory 102 is configured by storage means such as semiconductor memory, magnetic disk, optical disk, and others.

Figure 2:
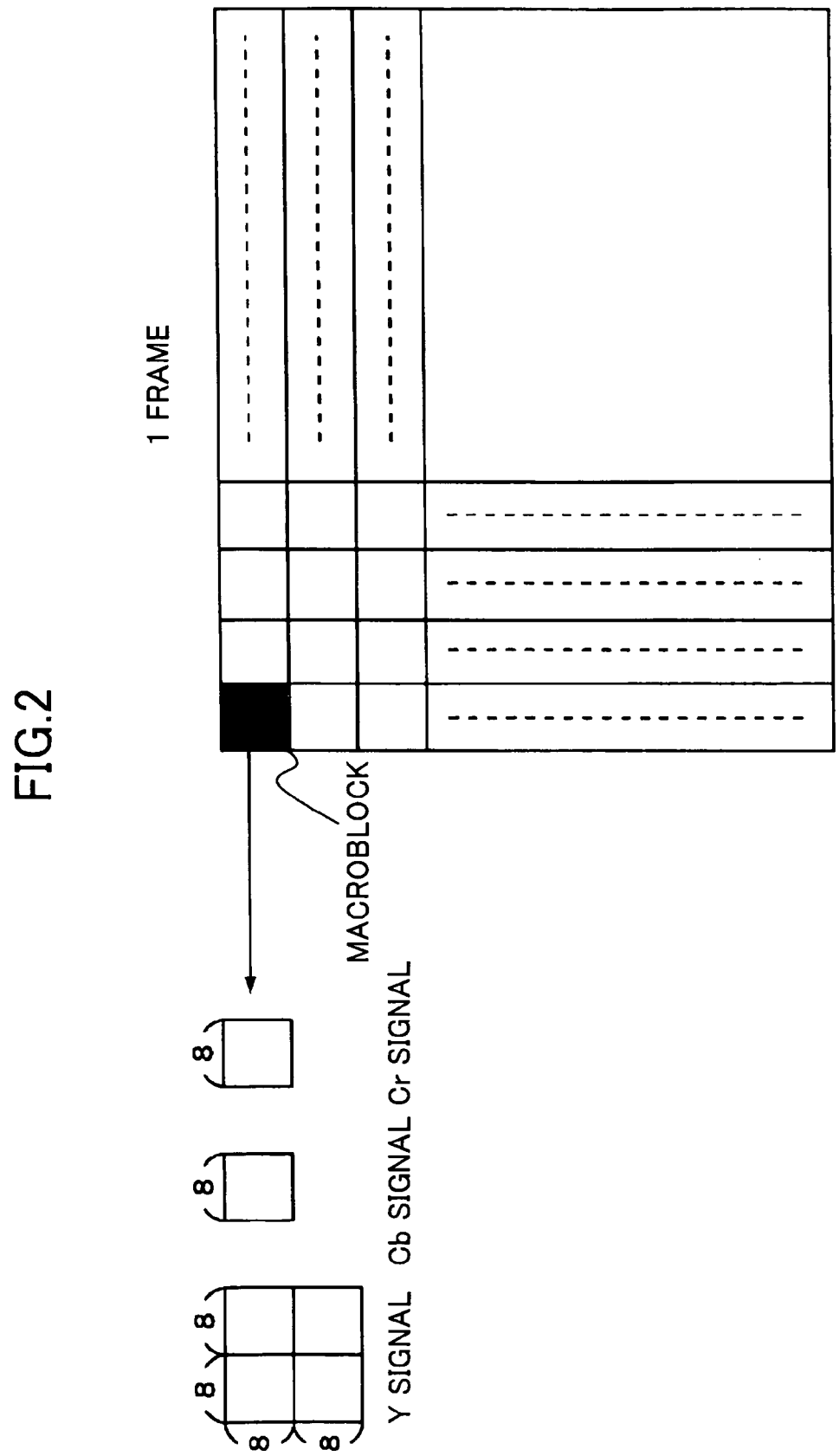
FIG. 2 is a diagram showing macroblocks in a frame.

The current image data stored in the frame memory 102 is forwarded to encoding means 116 on a basis of macroblock shown in FIG. 2, and encoded by the encoding means 116. Herein, the encoding means 116 may perform encoding with any transformation method as long as the encoding method uses orthogonal transformation such as DCT, wavelet transformation, and Hadamard transformation for converting images in the input video signal into frequency domain.

In the below, exemplified in the first embodiment is a case of performing encoding using MPEG4, which is an encoding method using DCT.

After input the current image data, the encoding means 116 outputs a bit stream corresponding to the current image data that has been encoded. Out of the encoding parameters corresponding to thus performed encoding, the encoding means 116 outputs one or two of the encoding parameters to filter control means 117. The encoding parameters denote parameters relating to the encoding process, including quantiser scale parameter, inter/intra ratio, bit stream encode volume, target bit rate, or others.

Here, the inter/intra ratio is a ratio, in a frame, between the number of macroblocks through with intra encoding and the number of macroblocks through with inter encoding. In a frame for intra encoding, every macroblock is to be subjected to intra encoding. Accordingly, the inter/intra ratio in a frame for intra encoding is 0 in value. But in a frame for inter encoding, there are not the all macroblocks which are subjected to inter encoding, but some macroblocks are subjected to inter encoding and some macroblocks are subjected to intra encoding. Generally, with the case of intra encoding, the encode volume is increased. Therefore, in a frame for inter encoding, if the ratio of the macroblocks to be subjected to inter encoding is high, the inter/intra ratio is increased in value, and the encode volume is reduced. On the other hand, when the ratio of the macroblocks to be subjected to inter encoding is low, the inter/intra ratio is reduced in value, and the encode volume is increased. As such, the correlation is observed between the inter/intra ratio and the encode volume, and thus the inter/intra ratio can be also dealt as an encoding parameter that indicates increase and decrease of the encode volume.

What is more, the quantiser scale is a coefficient serving as denominator for a computation process in quantization, which will be described later. When the quantiser scale is increased in value, the encode volume of a bit stream is reduced, and when the quantiser scale is reduced, the encode volume of a bit stream is increased. As such, there is a correlation between the quantiser scale and the encode volume, and the quantiser scale can be also dealt as an encoding parameter that indicates increase and decrease of the encode volume.

Further, the target bit rate may be also dealt as an encoding parameter. More specifically, if the target bit rate is larger, the quantiser scale is reduced in value, and as a result, the encode volume is increased for a bit stream. On the other hand, if the target bit rate is smaller, the quantiser scale is increased in value, and as a result, the encode volume is reduced for a bit stream. As such, the target bit rate has also a correlation with the encode volume, and the target bit rate can be also dealt as an encoding parameter that indicates increase and decrease of the encode volume.

Based on an encoding parameter provided by the encoding means 116, the filter control means 117 outputs filter characteristics control data K to the prefilter 101 for controlling the characteristics of the prefilter 101.

Thereafter, based on the filter characteristics control data K, the prefilter 101 outputs predetermined frequency components in the input video signal.

Described now is the operation of the encoding means 116.

As described in the foregoing, to the encoding means 116, the current image data that is partitioned on a macroblock basis is input from the frame memory 102. Then, the current image data is forwarded to a subtracter 103 and movement detection means 113 in the encoding means 116.

In a case of performing intra encoding in the encoding means 116, the current image data thus input to the subtracter 103 is output to DCT means 104 with no computation performed by the subtracter 103. The current image data thus input to the DCT means 104 is first subjected to DCT in the DCT means 104, and the result is then output to quantization means 105. Note that, in the below, the current image data having been subjected to DCT is referred to as DCT data.

After input the DCT data, the quantization means 105 quantizes the DCT data in accordance with a quantiser scale Qp, which comes from encode volume control means 115. Thus quantized DCT data is forwarded to both inverse quantization means 108, and DC/AC prediction means 106. Herein, the quantiser scale Qp denotes a parameter that is determined by the encode volume of a bit stream coming from variable-length encoding means 107, which will be described later.

Note that, in the below, the DCT data having been subjected to quantization is referred to as quantized data.

The quantized data coming from the quantization means 105 is decoded by the inverse quantization means 108, and inverse DCT means 109.

To be specific, the quantized data will become DCT data as a result of inverse quantization by the inverse quantization means 108, and the result is forwarded to the inverse DCT means 109. The DCT data is then decoded as a result of inverse DCT by the inverse DCT means 109, and the result becomes the current image data that has been decoded (hereinafter, the decoded current image data is referred to as decoded current image data) The decoded current image data is then forwarded to an adder 110.

After going through the adder 110, the decoded current image data is recorded into memory 111. Note here that, in a case of performing intra encoding in the encoding means 116, the adder 110 performs no computation for the decoded current image data. Therefore, in the memory 111, the current image data provided by the inverse DCT means 109 is recorded with no change in value.

On the other hand, the DC/AC prediction means 106 provided by the quantized data from the quantization means 105 computes a differential between a DC coefficient in the quantized data corresponding to the current image data, and a DC coefficient in the quantized data corresponding to one-frame-preceding image data (hereinafter, referred to as preceding image data) in the current image data. Data corresponding to thus computed differential is output to the variable-length encoding means 107 (hereinafter, referred to as DC differential data). Moreover, similarly to the DC coefficient, the DC/AC prediction means 106 computes differential data for an AC coefficient in the quantized data (hereinafter, the differential data for the AC coefficient is referred to as AC differential data). The resulting AC differential data is output to the variable-length encoding means 107. Note here that when outputting the DC differential data and the AC differential data, the DC/AC prediction means 106 forwards also additional information such as the quantizatiser scale Qp to the variable-length encoding means 107.

In the variable-length encoding means 107, variable-length encoding is performed with respect to the DC differential data, the AC differential data, and the additional information all coming from the DC/AC prediction means 106. The variable-length encoding means 107 then outputs a bit stream corresponding to the data having been subjected to the variable-length encoding.

On the other hand, in a case of performing inter encoding in the encoding means 116, the subtracter 103 outputs data corresponding to a differential between the current image data and predicted image data provided by predicted image forming means 112 (hereinafter, referred to as differential image data). With respect to the differential image data, similarly to the above case of performing intra encoding, performed are DCT, quantization, and variable-length encoding. Herein, in a case of performing inter encoding, the DC/AC coefficient estimation prediction means 106 does not compute neither the DC differential data nor the AC differential data, and outputs just the quantized data corresponding to the differential image data provided by the quantization means 105 (hereinafter, referred to as quantized differential image data) to the variable-length encoding means 107.

Here, the predicted image data is image data to be generated by a motion vector detected in the motion detecting means 113 by the preceding image data and the current image data, and the decoded preceding data that has been recorded in the memory 111. In this sense, the differential image data is data corresponding to an error between the current image data and the predicted image data. Here, the decoded preceding image data is decoded image data corresponding to one-frame-preceding image data in the current image data.

With the processing procedure described above, the current image data is encoded in the encoding means 116.

The issue here is that, generally, if a subject or others moves fast for display in an image corresponding to an incoming video image, or if any scene change occurs to a frame, the encode volume of a bit stream is output by the variable-length encoding means 107 is increased.

If the encode volume is increased as such, for the need to comprehensively control the encode volume, the encode volume control means 115 outputs a quantiser scale Qp that is larger in value and corresponding to the encode volume in order to control the quantization means 105. This is done for the purpose of decreasing the encode volume corresponding to the frame after scene change. Here, with MPEG4, the quantiser scale Qp takes a value from 1 to 31.

Generally, the image data through with DCT is split into frequency components, and quantized in increasing order from low-frequency components to high-frequency components. As such, when quantization is performed in order from the low-frequency components, in the image data, the high-frequency components and frequency components closer to the high-frequency components have the tendency to be suppressed. Therefore, as described in the foregoing, if the quantiser scale Qp is increased in value for the purpose of decreasing the encode volume corresponding to the frame after scene change, this may result in elimination of not only the high-frequency components but also intermediate-frequency components. If the intermediate-frequency components are eliminated as such, displaying images will suffer spatial deterioration such as block deformation that is often observed at the time of DCT and quantization, thereby resulting in image quality degradation.

Figure 3:
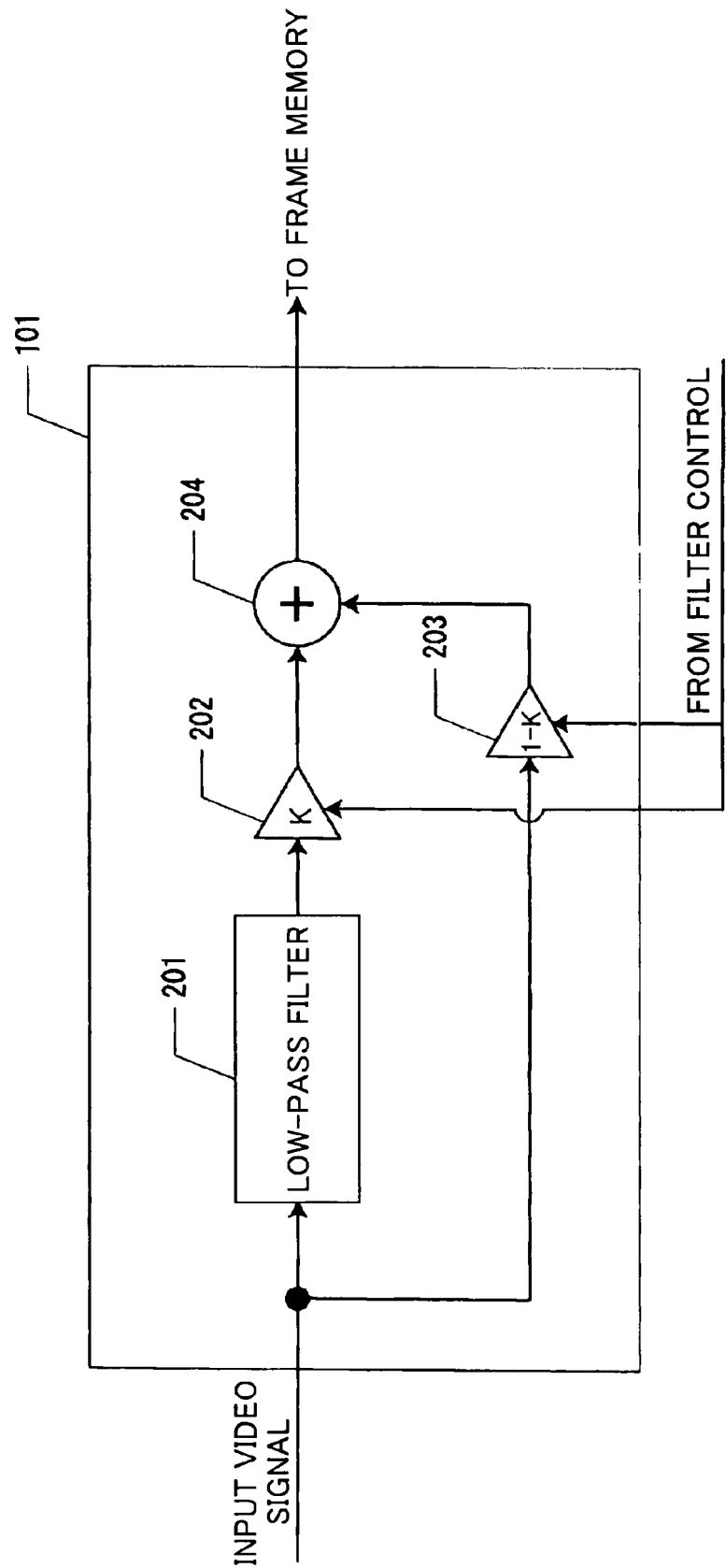
FIG. 3 is a block diagram showing the structure of a prefilter in the first embodiment.

In consideration thereof, in order not to increase the encode volume for the scene-changed frame, and to reduce the value of the quantiser scale Qp for the frame after scene change, the prefilter 101 of such a structure as shown in FIG. 3 is placed in the preceding stage of the frame memory 102 as shown in FIG. 1. This placement enables to eliminate any high-frequency components in advance from an incoming video signal, and resultantly enables application of comprehensive control to derive the appropriate encode volume. Accordingly, this can prevent image quality degradation in the frame after scene change.

By referring to FIG. 3, an incoming video signal is input into a low-pass filter 201. From this low-pass filter 201, low-frequency components in the input video signal are forwarded to a first gain controller 202. In the frequency components in the input video signal, it is an arbitrary matter which frequency components are to be set as the low-frequency components. In an exemplary manner, it can be arbitrarily determined by setting any appropriate sampling frequency (fs/2) to the low-pass filter 201, and by providing any appropriate characteristics (for example, FIG. 4) thereto. Note that in the low-pass filter having the characteristics of FIG. 4, frequency components lower than the sampling frequency (fs/2) in the input video signal are output to the first gain controller 202. The output result is multiplied by a gain corresponding to the frequency components, and the low-frequency components as a result of multiplication are forwarded to an adder 204.

On the other hand, the input video signal is forwarded also to a second gain controller 203.

The second gain controller 203 and the first gain controller 202 are both provided with the filter characteristics control data K from the filter control means 117, and a gain of the first gain controller 202 is set to (K), and a gain of the second gain controller 203 is set to (1-K), respectively. Here, the filter characteristics control data K takes a value of $0 \leq K \leq 1$.

The input video signal is corrected by setting of the gain of the first gain controller to the filter characteristics control data K, by correction of the low-frequency components in the input video signal, and by setting of the gain of the second gain controller to (1-K). Here, when K=1 is set as the gain of the first gain controller, the low-frequency components in the input video signal are not attenuated. When K=0 is set as the gain of the first gain controller, the input video signal is not attenuated. Therefore, the correction applied as above includes a case of not correcting the low-frequency components in the input video signal, or a case of not correcting the input video signal.

Furthermore, in the below, the low-frequency components is output by the first gain controller 202 are referred also to as corrected low-frequency components, and an input video signal is output by the second gain controller 203 is referred also to as corrected video signal.

In the conventional technology as described above, a filter characterization factor corresponding to the filter characteristics control data K is set by calculating an encoding difficulty using a plurality of encoding parameters. With this being the case, as described in the Prior Art section, this increases the volume of computation due to complexity of computation, and increases the load on a computation section, thereby increasing the power consumption, for example. In consideration thereof, the first embodiment adopts such a structure that a data table configuring by the quantiser scale Qp and the filter characteristics control data K is provided to the filter control means 117, and the filter characteristics control data K is output from the data table based on the quantiser scale Qp corresponding to the encode volume in the encoding means 116. Note here that FIGS. 5 and 6 each show an exemplary data table.

By using such a data table as above, the prefilter 101 can be defined by characteristics with no complicated computation, and thereby, the computation speed can be increased, the power consumption can be reduced, and the like.

Figure 4:
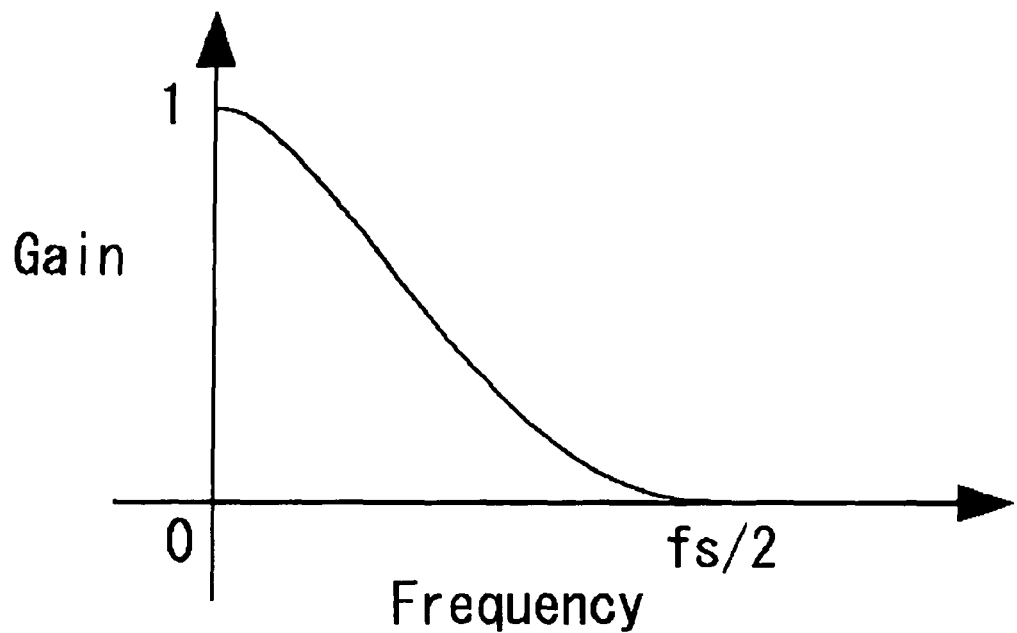
FIG. 4 is a diagram showing an exemplary characteristic of a low-pass filter 201 of FIG. 3.
Figure 7:
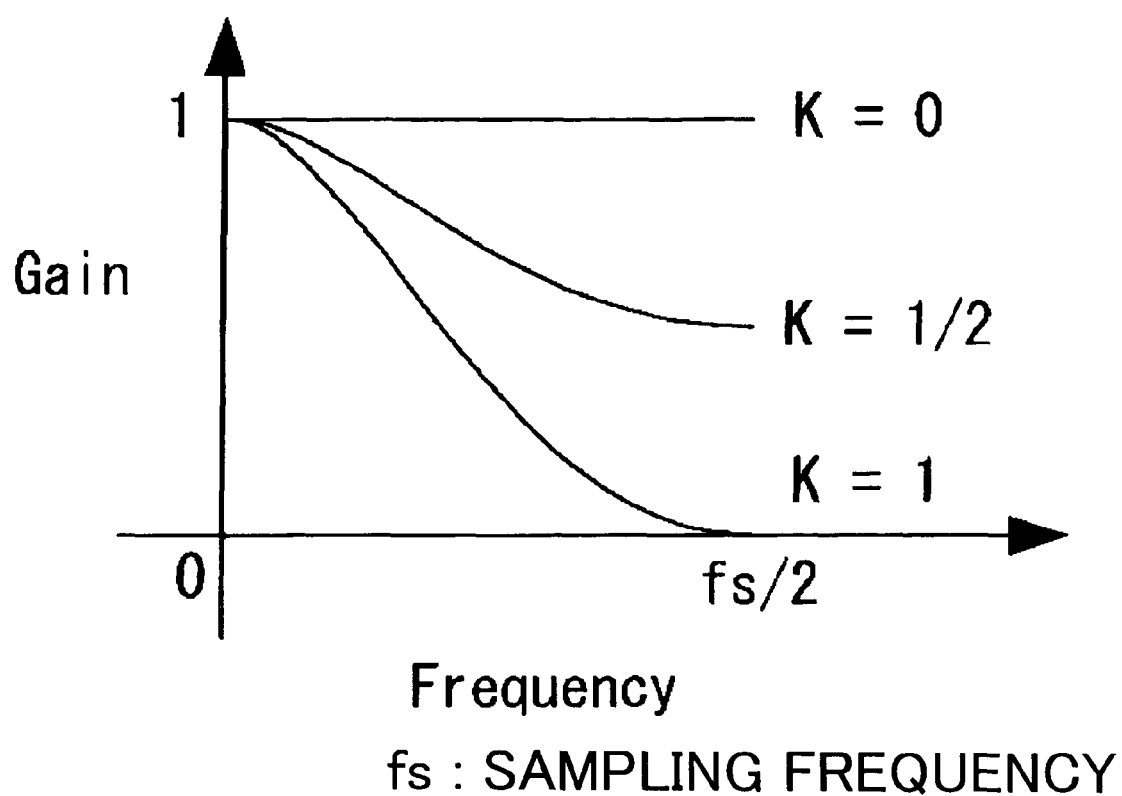
FIG. 7 is a diagram showing an exemplary characteristic of the prefilter in the first embodiment.

When the characteristics of FIG. 4 are provided to the low-pass filter 201, and when data in the data table is set as FIG. 5, the characteristics of the prefilter will change as shown in FIG. 7.

When the quantiser scale Qp is small (when QP$\leq$8 in FIG. 5), the first gain controller 202 is provided with 0 as the filter characteristics control data K, and the prefilter 101 outputs just the input video signal. On the other hand, when the quantiser scale Qp is large (when QP$\geq$25 in FIG. 5), the first gain controller 202 is provided with 1 as the filter characteristics control data K, and the prefilter 101 outputs just the output of the low-pass filter 201.

Moreover, when the quantiser scale Qp is mid-level value (when 9≦QP≦24 in FIG. 5), the first gain controller 202 is provided with ¼ or ½ as the filter characteristics control data K. With the filter control data K of ¼, the prefilter 101 outputs a video signal in which the high-frequency components in an incoming signal (frequency components are cut by low-pass filter) is attenuated to ¾. Moreover, with the filter control data K of ½, the prefilter 101 outputs a video signal in which the high-frequency components in an incoming signal are attenuated to ½.

That is, using the prefilter 101 enables to attenuate the high-frequency components in an input video signal output by the low-pass filter 201 in an adaptive manner. The attenuation is performed in accordance with the encode volume in the encoding means 116 without attenuating the low-frequency components of the input video signal.

Note that, in the above description, the quantiser scale Qp is Qp≦8 when small, Qp≧25 when large, and 9≦Qp≦24 when in a mid-level. The size criterion of the quantiser scale Qp can be arbitrarily set in accordance with the characteristics of devices or others in the video signal encoding device.

The filter characteristics control data K may be updated on a macroblock basis, or on a Video Object Plane (hereinafter, referred to as VOP) basis. To update the filter characteristics control data K on a VOP basis, the filter control data K corresponding to the macroblock that is encoded first in each VOP may be fixed in value until every macroblock in the VOP is completely through with encoding.

Figure 8:
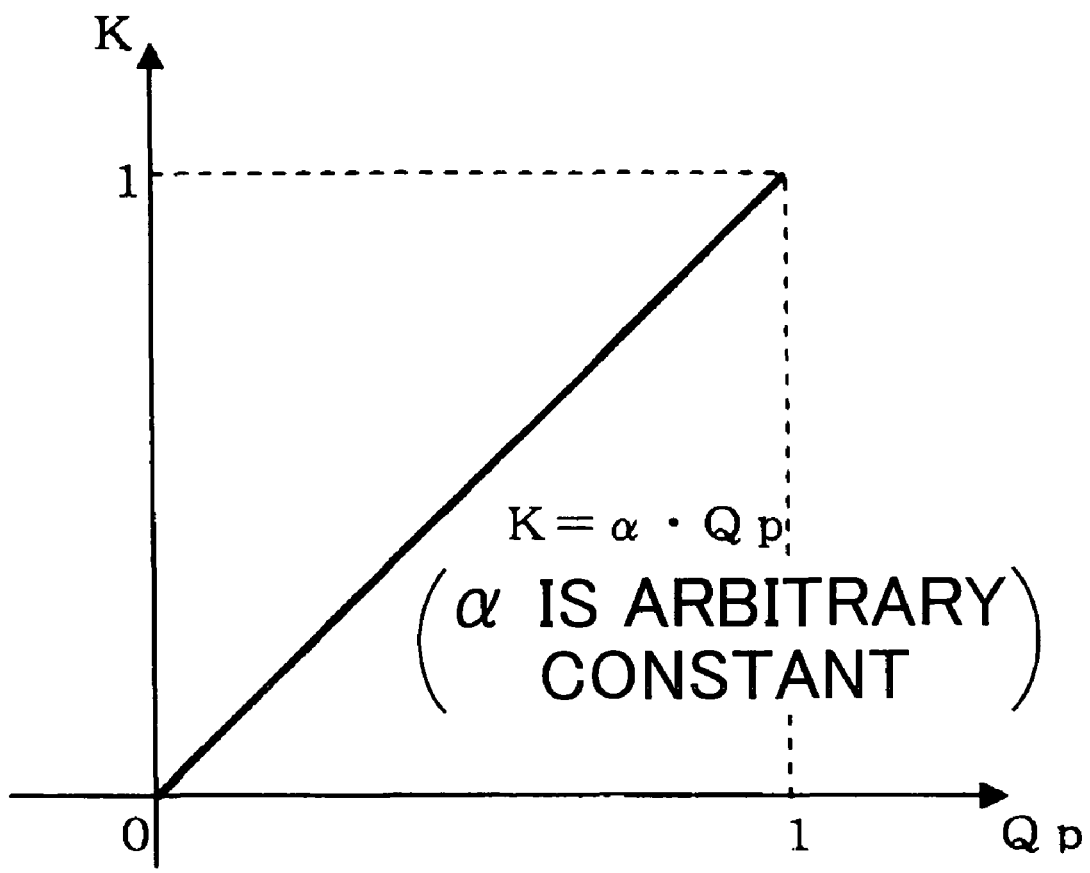
FIG. 8 is a diagram showing an exemplary function for determining filter characteristics data.
Figure 9:
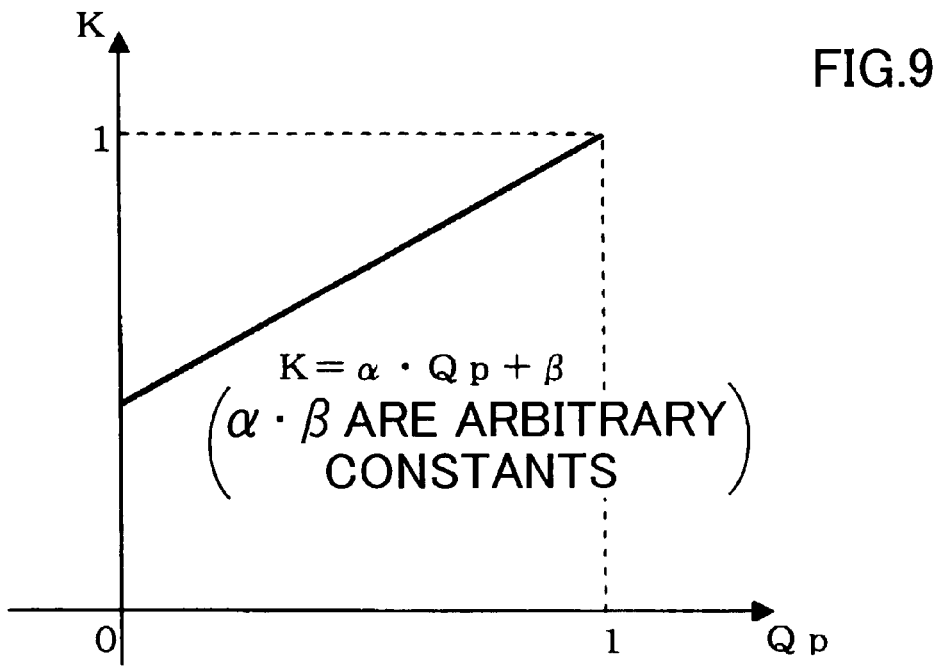
FIG. 9 is a diagram showing another exemplary function for determining the filter characteristics data.
Figure 10:
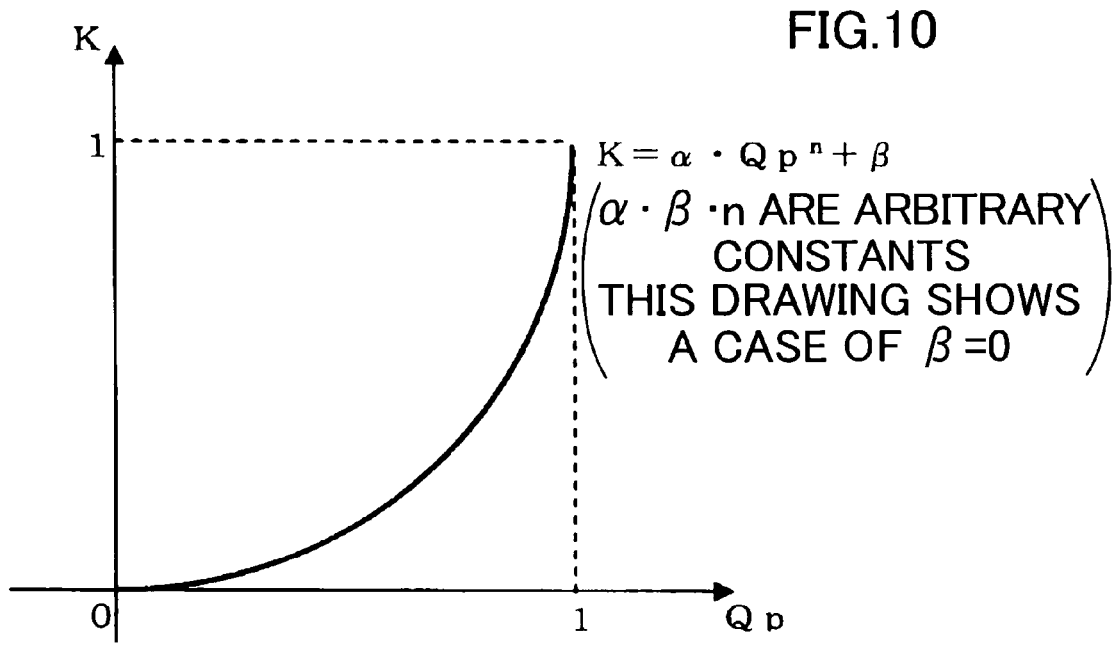
FIG. 10 is a diagram showing still another exemplary function for determining the filter characteristics data.

Note that, in the first embodiment, a data table is used to simplify the determination of the filter characteristics control data K. Alternatively, the inventors have found by experiment or others that a simple function as shown in FIGS. 8 to 10 may be used to determine the filter characteristics control data K with the same level of computation volume as referring to the data table.

In the first embodiment, the filter characteristics control data K is determined based only on the quantiser scale Qp out of plural encoding parameters for encoding in the encoding means 116. The encoding parameter for use to determine the filter characteristics data may be an inter/intra ratio or a target bit rate, or the encode volume itself, as long as it is related to the encode volume in the encoding means 116. Alternatively, the filter characteristics control data K may be determined based on both the quantization parameter and the inter/intra ratio. Still alternatively, the filter characteristics control data K may be determined based on both the encode volume and the inter/intra ratio. Still alternatively, the filter characteristics control data K may be determined based both on the target bit rate and the quantiser scale, or on the target bit rate and the encode volume.

Moreover, an encoding mode is a possibility as an alternative to the inter/intra ratio. That is, the encoding parameters may include an inter encoding mode in an inter frame encoding mode, and an intra encoding mode in a predictive encoding mode, a bidirectionally predictive encoding mode. These encoding modes may be used together with the quantiser scale, for example, to determine the filter characteristics control data K. Herein, as an encoding parameter for combination with the encoding modes, a target bit rate and the encode volume may be both an option.

Moreover, although exemplified in the first embodiment is MPEG4, this is not the only option for encoding in the encoding means 116, and MPEG1, MPEG2, H.263 are also possibly used for encoding, for example.

As described in the foregoing, in the video signal encoding device in the first embodiment, a prefilter can be defined by characteristics based on the encode volume in encoding means with a simple procedure requiring no complicated computation.

What is more, with no such complicated computation, the load on a computation section configured by a CPU or others is reduced, thereby successfully reducing the power consumption.

Furthermore, a prefilter is so structured that high-frequency components in an incoming video signal can be controlled in an adaptive manner corresponding to encode volume. Thanks thereto, the encode volume is prevented from increasing, and the resulting images can be high in quality with less degradation such as block deformation.

Second Embodiment

Generally, an incoming video signal includes noise components, and encoding such a noise-component-included input video signal will result in useless encode volume due to the noise components.

When the encode volume in the encoding means 116 is increased, the prefilter 101 in the first embodiment determines the filter characteristics control data K so as to eliminate high-frequency components. Therefore, when any useless encode volume is caused for the noise components, this resultantly eliminates the high-frequency components that are not supposed to be eliminated, thereby possibly causing degradation to displaying images.

In consideration thereof, a video signal encoding device in a second embodiment includes a noise reduction filter to the prefilter 101 so that the noise components are effectively controlled, and useless encode volume is prevented from causing in the encoding means 116.

Note here that the structure components of the second embodiment are similar to those of the first embodiment except for the structure of the prefilter, and thus those structure components and their operation are not described again. Moreover, in the second embodiment, an input video signal input to the prefilter is referred to as current image data, and in the current image data, one-frame-preceding image data is referred to as preceding image data.

Figure 11:
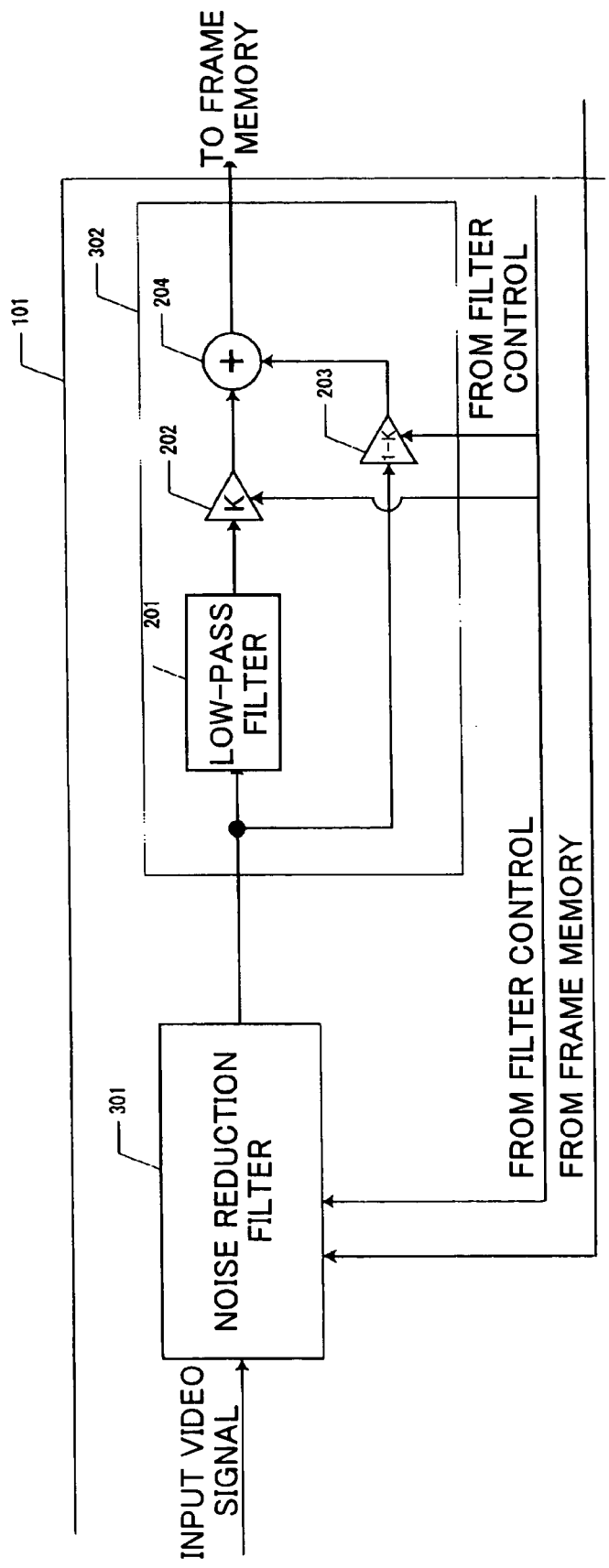
FIG. 11 is a diagram showing the structure of a prefilter in a second embodiment.

FIG. 11 shows the inner structure of the prefilter 101 in the second embodiment. As shown in FIG. 11, the prefilter 101 in the second embodiment is provided with a noise reduction filter 301 in the preceding stage to an inner prefilter 302. Here, the structure of the inner prefilter 302 in the second embodiment is similar to the prefilter in the first embodiment.

Figure 12:
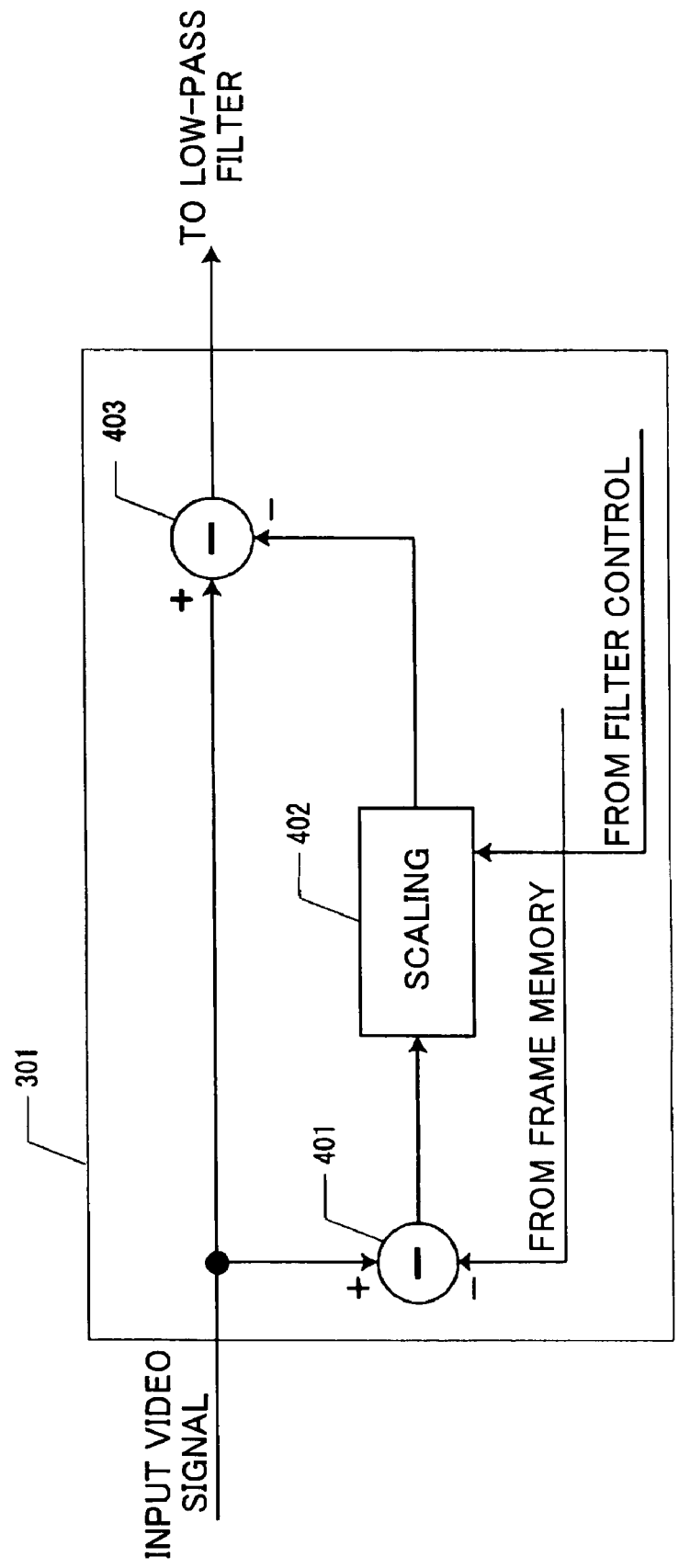
FIG. 12 is a diagram showing the structure of a noise reduction filter in the second embodiment.

FIG. 12 shows the inner structure of the noise reduction filter 301 in FIG. 11.

In FIG. 12, the current image data is provided to both a first subtracter 401 and a second subtracter 403. The first subtracter 401 is provided with preceding image data that is recorded in the frame memory 102, and a differential between the current image data and the preceding image data is computed (hereinafter, the differential is referred to as differential data). The resulting differential data is output to scaling means 402.

The scaling means 402 compares the differential data with a threshold value Th coming from the filter control section 117. When the differential data is smaller than the threshold value Th, the scaling means 402 outputs just the differential data, or the corrected differential data to the second subtracter 403. On the other hand, when the differential data is larger than the threshold value Th, the differential data is not output.

Here, similarly to the filter characteristics control data K in the first embodiment, the threshold value Th is output from the filter control means 117 based on encoding parameter(s) in the encoding means 116. The threshold value Th may be output from a data table, which looks as the one in FIG. 13 including threshold values Th corresponding to the quantization parameters. Alternatively, the threshold values Th may be output through computation using such functions as FIGS. 8 to 10. When the threshold value Th is determined by the computation as above, the filter control data K in the functions of FIGS. 8 to 10 is surely replaced with the threshold value Th for computation.

The scaling means 402 may be characterized to output just the differential data or the corrected differential data when the differential data is smaller than the threshold value Th, and not to output the differential data when the differential data is larger than the threshold value. Therefore, the scaling means 402 may be defined by characteristics as shown in FIGS. 14 to 16, for example.

The differential data provided by the scaling means 402 is subtracted from the current image data in the subtracter 403, and the result is then output to the low-pass filter 201 in the inner prefilter 302.

Figure 14:
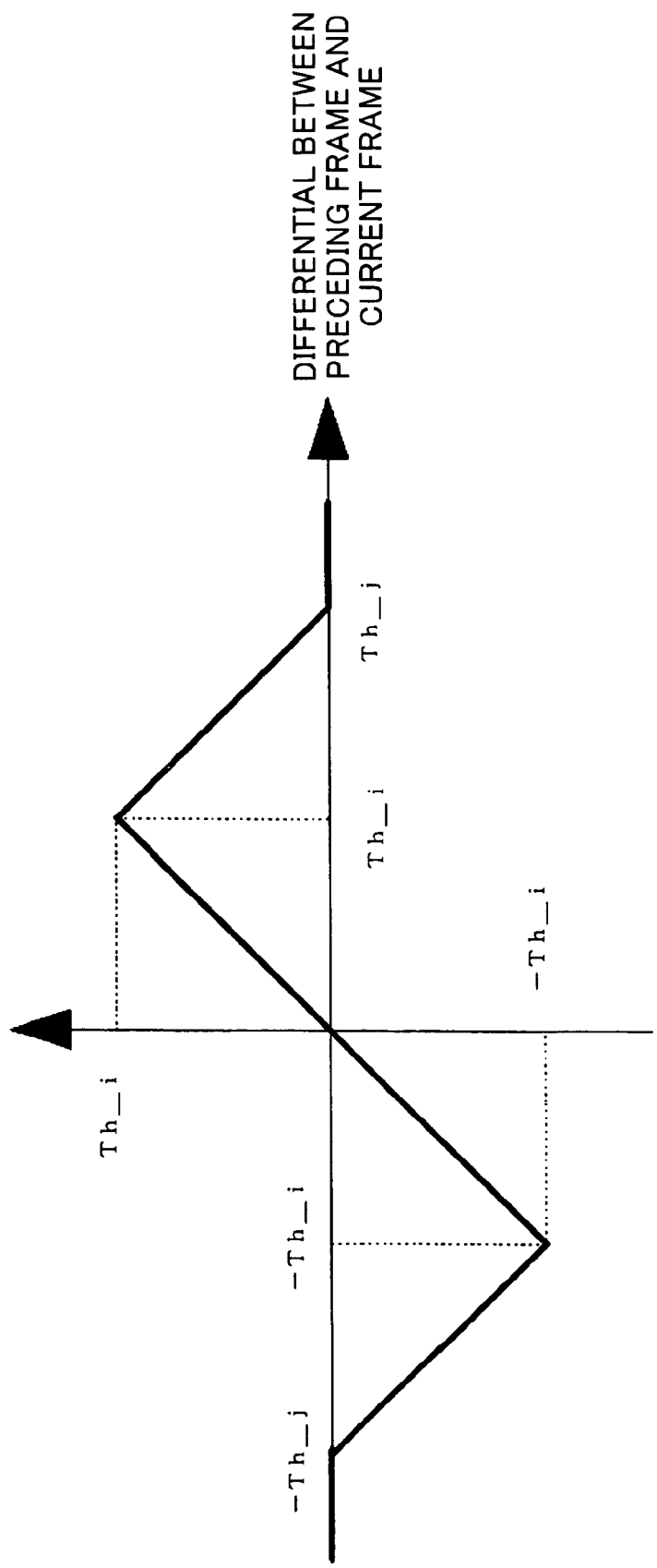
FIG. 14 is a diagram showing an exemplary characteristic of scaling means in the second embodiment.
Figure 15:
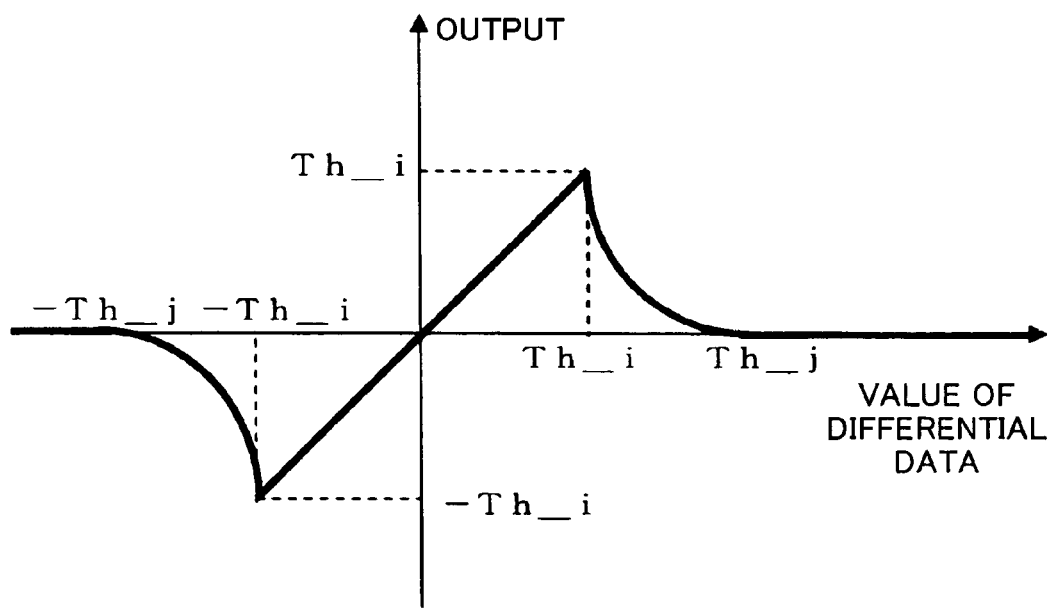
FIG. 15 is a diagram showing another exemplary characteristic of the scaling means in the second embodiment.
Figure 16:
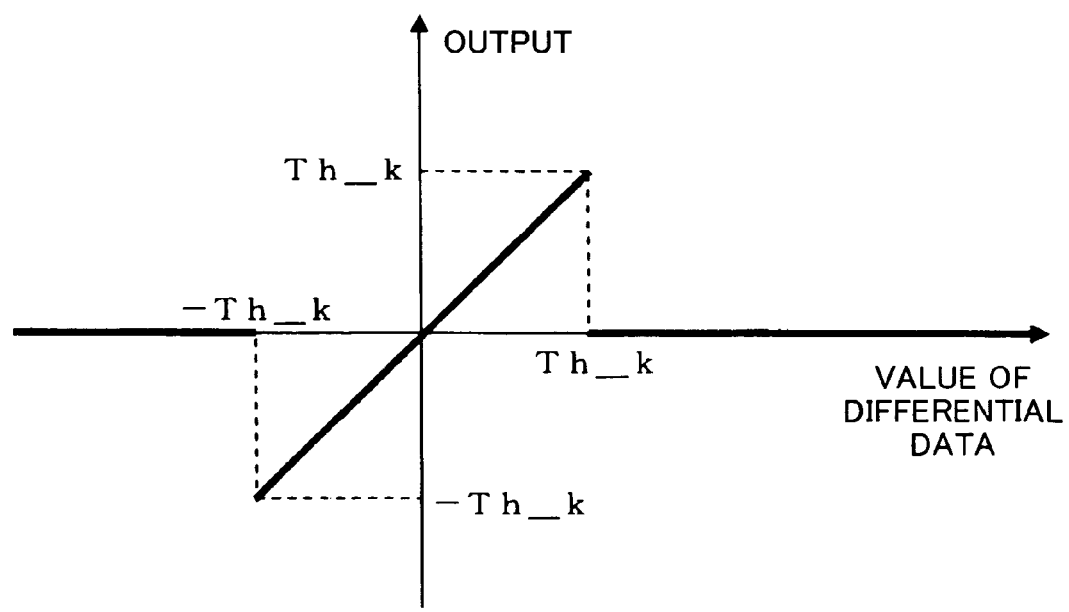
FIG. 16 is a diagram showing still another exemplary characteristic of the scaling means in the second embodiment.

For example, in the scaling means 402 with the characteristics of FIG. 14 or 15, when the differential data provided thereto is smaller than a threshold value Th_i, the data as a result of subtracting the differential data from the current image data, i.e., data having the same value as the preceding image data, is output from the noise reduction filter 301 to the low-pass filter 201.

On the other hand, when thus provided differential data is larger than the threshold value Th_i but smaller than a threshold value Th_j, the current image data corrected based on an output from the scaling means 402 is output from the noise reduction filter 301 to the low-pass filter 201. When the provided differential data is equal to or larger than the threshold value Th_j, it means that there is no output from the noise reduction filter, and thus just the current image data is output to the low-pass filter 201.

What is more, in the case of using the scaling means 402 with the characteristics of FIG. 16, the noise reduction filter 301 outputs such image data as below to the low-pass filter 201.

That is, when the incoming differential data is smaller than a threshold value Th_k, the data as a result of subtracting the differential data from the current image data, i.e., data having the same value as the preceding image data is output to the low-pass filter 201, and when it is equal to or larger than the threshold value Th_k, just the current image data is output to the low-pass filter.

FIGS. 17 each show an exemplary image corresponding to the image data provided by the noise reduction filter 301. Herein, for the purpose of clearly showing how noise components affect images, the images in FIGS. 17 are enlarged.

In FIGS. 17, (a) is an image corresponding to the preceding image data, (b) is an image corresponding to the current image data, and (c) is an image corresponding to the image data provided by the noise reduction filter 301.

By the noise reduction filter 301 controlling the noise components, for example, image flickering caused by noise components exemplarily to a section A in (b) is not observed in the image (c) corresponding to the data provided by the noise reduction filter 301.

As described in the foregoing, in the video signal encoding device of the second embodiment, including a noise reduction filter can eliminate noise components in an incoming video signal prior to encoding. Accordingly, it becomes possible to control any useless encode volume due to the noise components in the encoding means, and to derive the same effects as in the first embodiment.

Third Embodiment

Figure 18:
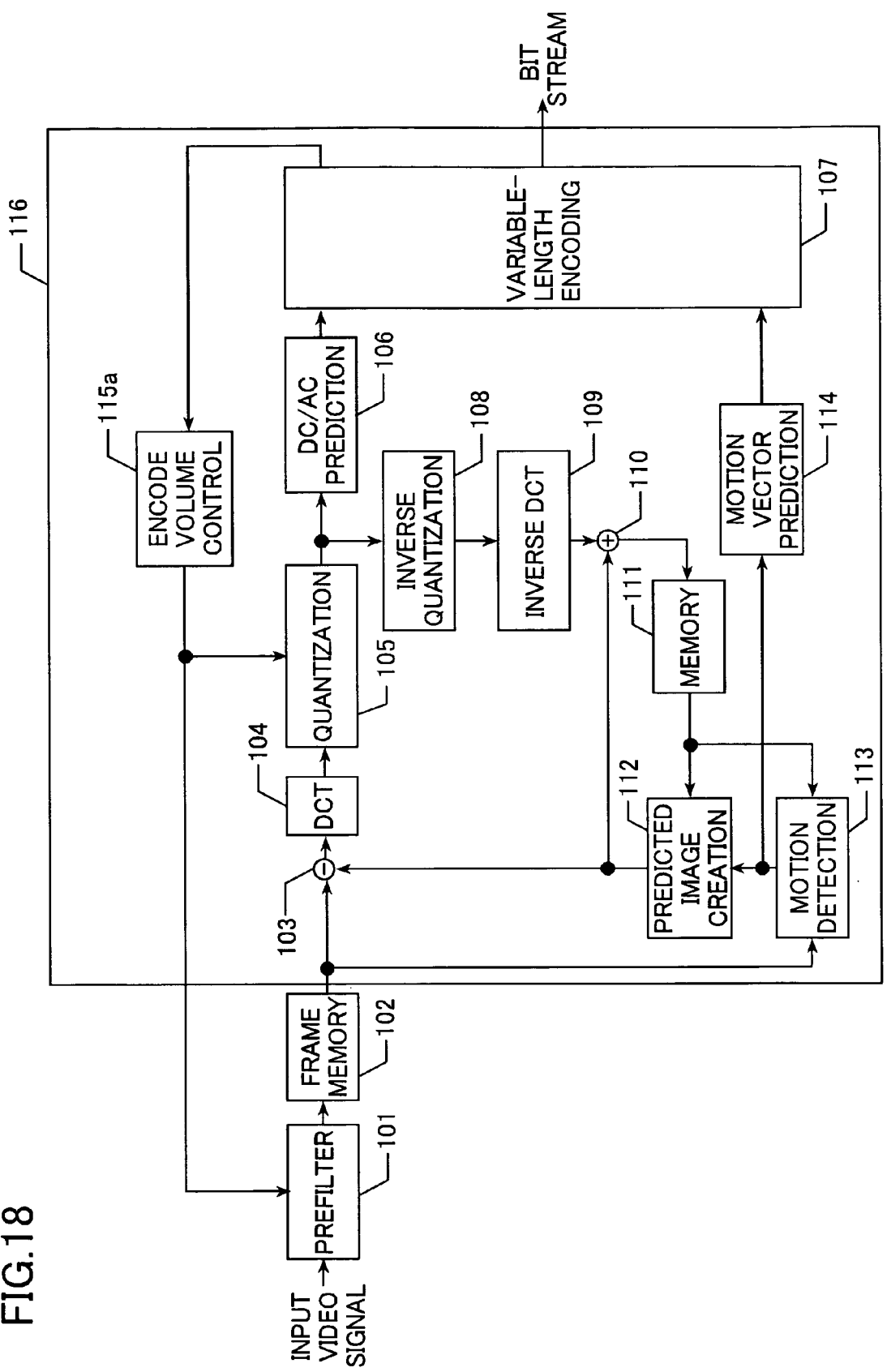
FIG. 18 is a block diagram showing a video signal encoding device in a third embodiment.

FIG. 18 is a block diagram showing a video signal encoding device in a third embodiment.

In the third embodiment, the filter control means 117 and the encode volume control means 115 in the first or second embodiment are configured as one piece, and the resulting piece is referred to as encode volume control means 115a. Note here that the structure components other than the encode volume control means 115a and their operations are similar to those in the first or second embodiment.

Similarly to the first or second embodiment, the encode volume control means 115a outputs a quantiser scale Qp in the quantization means 105 based on the encode volume provided by the variable-length encoding means 107, and outputs to the prefilter 101 the filter characteristics control data K in accordance with the quantiser scale Qp.

As described in the foregoing, in the video signal encoding device in the third embodiment, the filter control means 117 and the encode volume control means 115 in the first and second embodiments are configured as one piece so that the video signal encoding device can be simplified in structure. What is more, the same effects as the first or second embodiment can be derived.

Fourth Embodiment

In the video signal encoding devices in the first to third embodiments, when a compression rate, a bit rate, or others are set as target based on the encode volume in the encoding means 116, the compression rate or others cannot be changed until the current image data provided to the encoding means 116 is completely through with encoding.

Therefore, in an exemplary system for distributing bit streams being outputs from the encoding means in real time, if any trouble occurring to a transmission path disables to transmit the bit streams with a current rate, there requires to lower the target bit rate in the video signal encoding device. On the other hand, the video signal encoding device in the first to third embodiments cannot be ready for such a case. Accordingly, even if the bit streams corresponding to the input video signal are output, a problem may arise that the bit streams may not be distributed.

In consideration thereof, a video signal encoding device of a fourth embodiment allows external provision of parameters about controlling the encode volume such as the compression rate and the bit rate to the encode volume control means 115 or the filter control means 117. Also, based on the externally-provided compression rate, bit rate, or others, the target compression rate or others can be changed irrespective of the encoding stage so that the above-described problem can be solved. In the below, described is a case where a bit rate is provided as an external input.

Figure 19:
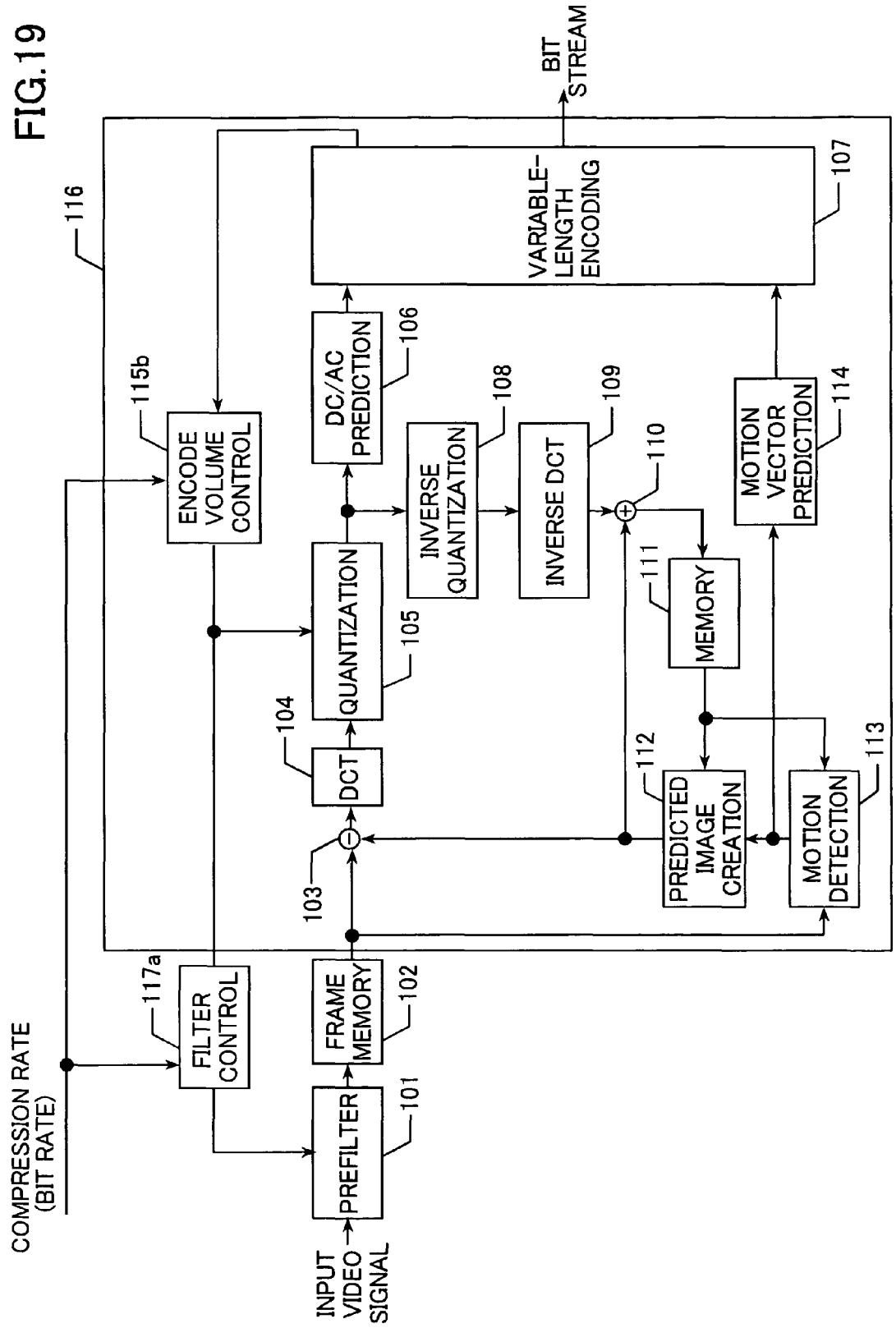
FIG. 19 is a block diagram showing a video signal encoding device in a fourth embodiment.

FIG. 19 is a block diagram showing the video signal encoding device in the fourth embodiment. Herein, the structure components other than encode volume control means 115b in the encoding means 116 and their operation are similar to the encoding means 116 in the first to third embodiments, and thus are not described again.

To the encode volume control means 115b and filter control means 117a in FIG. 19, a bit rate is provided from outside.

The encode volume control means 115b thus provided with a bit rate outputs a quantiser scale Qp to the quantization means 105 and the filter control means 117a based on the bit rate and the encode volume provided by the variable-length encoding means 107.

Based on the bit rate and the quantiser scale Qp, the filter control means 117a outputs the filter characteristics control data K to the prefilter 101. Herein, to determine the quantiser scale Qp, the encode volume control means 115b may use a data table configured by the quantization parameters, the bit rate, and the encode volume, or any appropriate function Qp=f(bit rate, the encode volume) is also a possibility for use. Moreover, also in the filter control means 117a, the filter characteristics control data K may be determined in a similar manner to the encode volume control means 115b.

Herein, the data table is not necessarily provided singly, but the data table may be plurally provided to the quantization means 105 or the filter control means 117a for a selection of the data table based on the bit rate. In an exemplary case of including such data tables as shown in (a) and (b) of FIG. 20, when the bit rate is high, the data table of (a) is used to output the larger quantiser scale or the filter characteristics control data K. On the other hand, when the bit rate is low, the data table of (b) is used to output the smaller quantiser scale or the filter characteristics control data K.

Alternatively, at least one function out of other functions shown in FIGS. 8 to 10 maybe set to the filter control means 117a, and using the function, the quantiser scale Qp or the filter characteristics control data K may be computed for output.

Here, in the video encoding device in a case where the filter control means 117a and the encode volume control means 115b are configured as one piece for use as encode volume control means 115c as in the third embodiment, as shown in FIG. 21, the bit rate may be input to the encode volume control means 115c.

As described in the foregoing, in the video signal encoding device of the fourth embodiment, in accordance with a bit rate that is externally provided, a target bit rate can be controlled in the video signal encoding device irrespective of the encoding stage of image data. Moreover, the prefilter can be controlled in such a manner as to suitably match to the bit rate. Furthermore, the same effects as the first to third embodiments can be derived.

INDUSTRIAL APPLICABILITY

As described in the foregoing, the present invention enables to define the characteristics of a prefilter in accordance with the encode volume in encoding means with no complicated computation.

Moreover, with no such complicated computation, the load on a computation section configured by a CPU or others is reduced, thereby successfully reducing the power consumption.

Furthermore, a prefilter is so structured that high-frequency components in an incoming video signal are controlled in an adaptive manner corresponding to the encode volume. Thanks thereto, the encode volume is prevented from increasing, and the resulting images can be high in quality with less degradation such as block deformation.

The invention claimed is:
1. A video signal encoding device, comprising:
a prefilter for outputting, based on filter characteristics control data, a predetermined frequency component in an input video signal as current image data;
an encoder for subjecting the current image data to an encoding process; and
a filter controller for outputting the filter characteristics control data that is set based on encoding parameters provided by the encoder, wherein
the prefilter includes:
a low-pass filter for outputting a low-frequency component in the input video signal;
a first output unit for correcting the low-frequency component based on the filter characteristics control data for output as a corrected low-frequency component; and
a second output unit for correcting the input video signal based on the filter characteristics control data for output as a corrected video signal, wherein
the prefilter outputs the predetermined frequency component in the input video signal based on the corrected low-frequency component or the corrected video signal, wherein
a first gain used for the correction of the low-frequency component by the first output unit and a second gain used for the correction of the input video signal by the second output unit are determined based on the filter characteristics control data, and when a quantiser scale (Qp) included in encoding parameters is enlarged, the first gain is increased and the second gain is decreased.

2. The video signal encoding device according to claim 1, wherein
the first output unit attenuates the low-frequency component based on the filter characteristics control data, and outputs the attenuated low-frequency component as the corrected low-frequency component, and
the second output unit attenuates the input video signal based on the filter characteristics control data, and outputs the attenuated input video signal as the corrected video signal.

3. The video signal encoding device according to claim 2, wherein
when the filter characteristics control data has a value of K ($0 \leq K \leq 1$),
the first gain is K, and the second gain is 1−K.

4. The video signal encoding device according to claim 1, wherein
the prefilter adds the corrected low-frequency component and the corrected video signal for output.

5. The video signal encoding device according to claim 1, comprising
a noise reduction filter for outputting a noise-controlled video signal derived by controlling a noise component in the input video signal, wherein
the prefilter outputs a predetermined frequency component in the noise-controlled video signal.

6. The video signal encoding device according to claim 5, wherein
the noise reduction filter compares differential data between the current image data and preceding image data that is data of a frame preceding to the current data, and a threshold value corresponding to one of the encoding parameters, and when the differential data is smaller than the threshold value, corrects the current image data.

7. A video signal encoding method, comprising:
a frequency component output process for outputting, based on filter characteristics control data, a predetermined frequency component in an input video signal as current image data;
an encoding parameter output process for subjecting the current image data to an encoding process, and outputting encoding parameters together with a bit stream corresponding to the current image data as a result of the encoding process; and a control data output process for outputting the filter characteristics control data that is set based on the encoding parameters, wherein the frequency component output process includes:

a low-frequency component output process for outputting a low-frequency component in the input video signal;

a first frequency component correction process for correcting the low-frequency component based on the filter characteristics control data for output as a corrected low-frequency component; and a second frequency component correction process for correcting the input video signal based on the filter characteristics control data for output as a corrected video signal, wherein the frequency component output process outputs the predetermined frequency component in the input video signal based on the corrected low-frequency component or the corrected video signal, wherein a first gain used for the correction of the low-frequency component at the first frequency component correction process and a second gain used for the correction of the input video signal at the second frequency component correction process are determined based on the filter characteristics control data, and when a quantiser scale (Qp) included in the encoding parameters is enlarged, the first gain is increased and the second gain is decreased.

8. A portable terminal, including the video signal encoding device according to claim 1.

9. A non-transitory computer-readable medium having stored thereon computer executable encoding program, the encoding program when executed causes a processor to execute:

a frequency component output step of outputting, based on filter characteristics control data, a predetermined frequency component in an input video signal as current image data;

an encoding parameter output step of subjecting the current image data to an encoding process, and outputting encoding parameters together with a bit stream corresponding to current image data as a result of the encoding process; and a control data output step of outputting the filter characteristics control data that is set based on the encoding parameters, wherein the frequency component output step includes:

a low-frequency component output step of outputting a low-frequency component in the input video signal;

a first frequency component correction step of correcting the low-frequency component based on the filter characteristics control data for output as a corrected low-frequency component; and a second frequency component correction step of correcting the input video signal based on the filter characteristics control data for output as a corrected video signal, wherein the frequency component output step outputs the predetermined frequency component in the input video signal based on the corrected low-frequency component or the corrected video signal, wherein a first gain used for the correction of the low-frequency component at the first frequency component correction step and a second gain used for the correction of the input video signal at the second frequency component correction step are determined based on the filter characteristics control data, and when a quantiser scale (Qp) included in the encoding parameters is enlarged, the first gain is increased and the second gain is decreased.

* * * * *